(12) United States Patent
Kumar et al.

(10) Patent No.: US 7,636,736 B1
(45) Date of Patent: Dec. 22, 2009

(54) METHOD AND APPARATUS FOR CREATING AND USING A POLICY-BASED ACCESS/CHANGE LOG

(75) Inventors: Nookala Sunder Phani Kumar, Pune (IN); Milind Borate, Pune (IN); Murali Nagaraj, Pune (IN); Sree Hari Nagaralu, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 288 days.

(21) Appl. No.: 11/232,253

(22) Filed: Sep. 21, 2005

(51) Int. Cl.
*G06F 17/00* (2006.01)
(52) U.S. Cl. .................... 707/104.1; 707/101; 707/102; 707/103 R
(58) Field of Classification Search ............... 707/1–10, 707/100–104.1, 200–206
See application file for complete search history.

(56) References Cited

U.S. PATENT DOCUMENTS

2004/0054696 A1* 3/2004 Sheinis et al. ............... 707/201
2005/0102326 A1* 5/2005 Peleg et al. .................. 707/200
2005/0114661 A1* 5/2005 Cheng et al. ................ 713/167

* cited by examiner

*Primary Examiner*—Isaac M Woo
(74) *Attorney, Agent, or Firm*—Moser IP Law Group

(57) ABSTRACT

A method and apparatus for creating and using a policy-based file access/change log. Using the policy-based techniques, specific objects within the file system are selected for logging within an access/change log. These selected objects are then processed to identify attributes of the selected objects that are to be logged such that a policy is created regarding the objects to be logged and the attributes of those objects. Lastly, the policy is applied to the object either by having a separate object (file) created that is related to the object to be logged that identifies the policy for logging, or by attaching certain attributes directly to the object such that access to the object identifies the logging policy for that object. When an object that uses policy-based logging is changed, the object access/change log policy is utilized to log only the information that is identified in the policy. In this manner, the amount of information that is logged is controlled by the logging policy, limiting the size of the access/change log.

15 Claims, 3 Drawing Sheets

METHOD AND APPARATUS FOR CREATING AND USING A POLICY-BASED ACCESS/CHANGE LOG

BACKGROUND OF THE INVENTION

1. Field of the Invention

Embodiments of the present invention generally relate to computer information storage and, more particularly, to creating and using access/change logs within a computer system.

2. Description of the Related Art

Data storage within a computer system is generally organized using a file system that consists of various objects including files, directories, devices, file sets, and the like. The file system organizes these objects to ensure that a user can find and utilize the objects that are available to the computer system. File systems can be localized within a single computer or distributed over a number of computers as a distributed file system.

To provide a user with an understanding of objects within the computer system as well as the changes and/or accesses to objects that occur over time, file access/change logs are used to track the changes that occur to the objects. Commonly assigned U.S. patent application Ser. Nos. 10/334,101, filed Dec. 30, 2002; 11/064,557, filed Feb. 24, 2005; and 60/695,799, filed Jun. 30, 2005, all of which are incorporated herein by reference in their entireties, each contain a detailed description of the creation and use of file change logs that are used to track changes and accesses to files stored on a computer or network.

A file access/change log identifies the files (and other objects) by inode number, file name, path name and/or reference number so that applications that utilize the file system can find objects and quickly ascertain which objects have been recently changed or accessed. The types of changes that are logged within a file access/change log include selected changes to metadata, links to the file, and attributes of the file as well as file creation, removal, access and modification dates. In some embodiments, file access/change logs identify files that have been modified, as well as the nature of the modification.

In very large file systems, the file access/change logs can be enormous such that a substantial amount of computer time is required to create and maintain the file access/change log. Such processing can be burdensome to the computer resources available to users.

Therefore, there is a need in the art for a method and apparatus for improving the creation and use of access/change logs.

SUMMARY OF THE INVENTION

The invention is a method and apparatus for creating and using a policy-based file access/change log. Using the policy-based techniques, specific objects within the file system are selected for logging within a access/change log. The specific objects to be logged may also be defined using an exclusionary technique, where, rather than specifically selecting objects for logging, objects are selected for exclusion and the non-excluded objects are, by default, selected for logging. These selected (or non-excluded) objects are then processed to identify attributes of the objects that are to be logged such that a policy is created regarding these objects and their attributes. Lastly, the policy is applied to the object either by having a separate object (file) created that is related to the object to be logged that identifies the policy for logging, or by attaching certain attributes directly to the object such that access to the object identifies the logging policy for that object. When an object that uses policy-based logging is changed and/or accessed, the object access/change log policy is utilized to log only the information that is identified in the policy. In this manner, the amount of information that is logged is controlled by the logging policy, limiting the size of the file access/change log.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
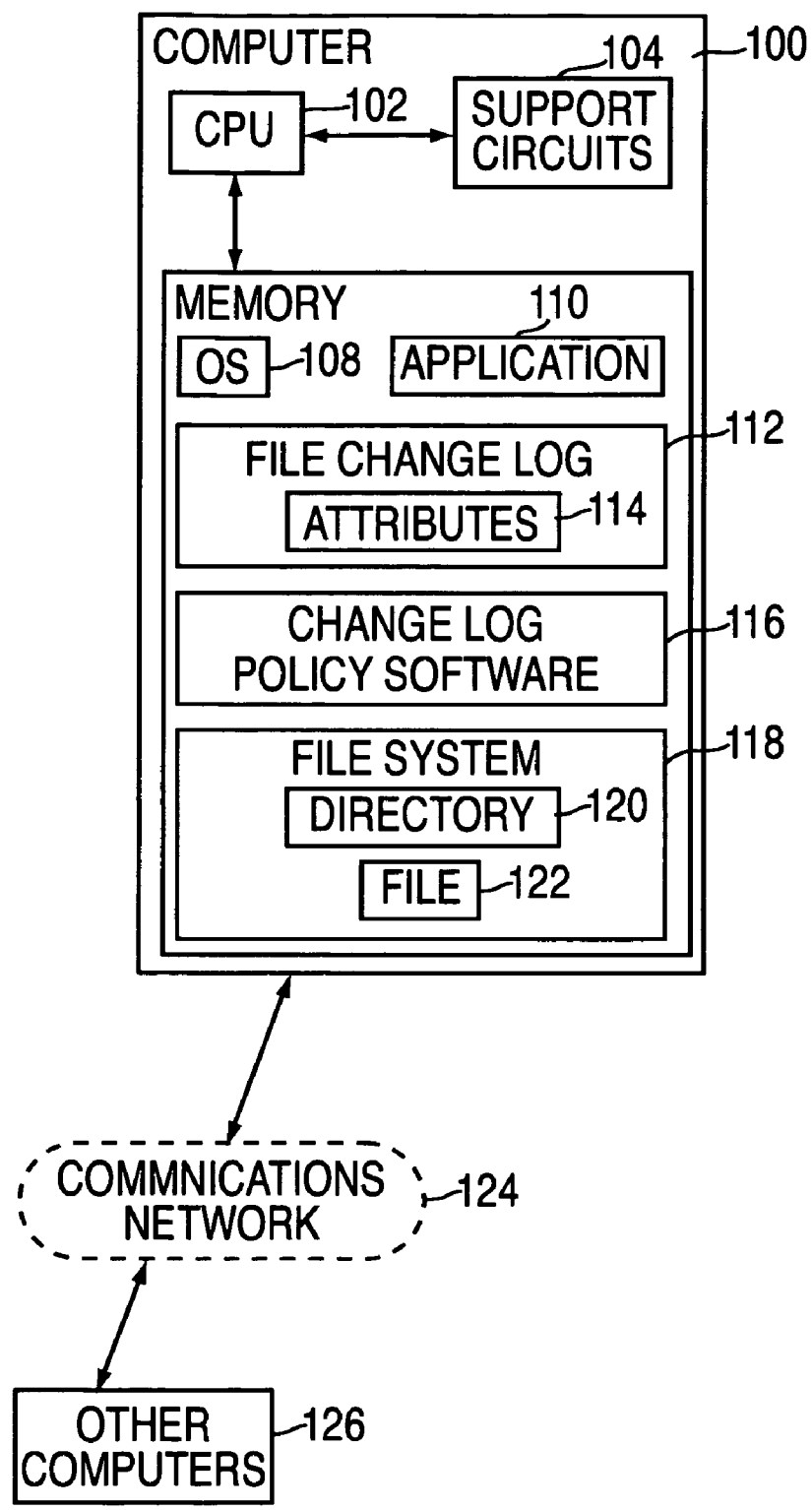
FIG. 1 depicts a block diagram of a computer system in which one embodiment of the invention maybe utilized.

FIG. 1 depicts a block diagram of a computer system 100 in which one embodiment of the present invention may be utilized. The computer 100 may include a work station, personal computer, server, PDA (Personal Digital Assistant), cell phone, storage network switch, storage device, storage at rank controller, or any other device configured to execute software implementing a file system that utilizes an access/change log. The computer system 100 comprises a central processing unit 102, support circuits 104, and memory 106. The CPU 102 may comprise one or more of conventionally available microprocessors or microcontrollers. The support circuits 114 are well known support circuits that are used to facilitate the operation of the CPU 102. The support circuits include power supplies, clock circuits, input/output interface circuitry, cache, and the like.

The memory 106 may comprise random access memory, read only memory, removable disc memory, flash memory, optical memory, and various combinations of these types of memory. The memory 116 is sometimes referred to as main memory and may be in part used as cache memory or buffer memory. The memory stores various forms of software and files, such as an operating system 108, application software 110, an access/change log 112, an access/change log policy software 116, and a file system 118. The file system 118 generally comprises directories, files, and other objects including, for example, a directory 120 and a file 122.

The computer 100 may be coupled to a communications network 124 and other computers 126. In the embodiment discussed herein, a single computer containing the access/change log 112, the access/change log policy software 116 and a file system 118 is described. However, those skilled in the art will understand that the file system as well as the computer software that operates the computer may be distributed amongst a number of computers to form a distributed processing system. Alternatively, in the network system other computers 126 may contain some of the software or all of the software that is utilized by the computer 100. Thus, the software such as the access/change log policy software 116 may actually reside on another computer within the network and be utilized by computer 100. Furthermore, the access/change log 112 and/or the access change log policy software 116 can be distributed over several computing devices in a network environment. The logs of the various computing devices may be updated in parallel from information regarding accesses and/or changes occurring in the various computing devices.

The network 124 can include one or more various types of networks. Network 124 may include local area networks (LAN) or wide area networks (WAN), such as the Internet, or a combination of one or more of different types of networks. Various media can be used to implement the network 124 including Ethernet links, wireless links, coaxial cables, and the like.

The file system 118 organizes data into files and/or directories, where a directory is a special type of file. The particular set of one or more directories and/or files that the file system organizes can also be referred to as a file system. In one embodiment, file system 118 is implemented using an application such as a VERITAS file system available VERITAS Software Corporation of Mountain View, Calif. Such as file system executes on a single computing device. In other embodiments, the file system 118 is a distributed file system that is implemented by executing an application such as VERITAS Cluster File System (CFS) on each of several independent computing devices.

In the present invention, the access/change log policy software 116 is executed to define policies for updating the access/change log 112. The file system 118 updates the access/change log 112 to indicate that a change (e.g., a change in the most recent access time associated with the file, a change in the value stored by the file, and the like) to one of the files 122 has occurred. Thus, the access/change log 112 stores information identifying files within the file system that have recently been accessed (e.g., written to or read from). In some embodiments, the file access/change log 112 identifies only files that have recently been modified (e.g., written to, created, renamed, moved, and/or deleted). In other embodiments, the file access/change log identifies files that have recently been read from and/or modified. The file system 118 updates the file access/change log in accordance with the policy generated by the access/change log policy software 116. The access/change log 112 is not updated for every modification to every file.

The access/change log 112 identifies files by inode numbers or other file reference information, such as, file name, path name, file reference numbers, and the like. The access/change log 112 may also contain certain attributes 114 of a file that are being tracked for changes for a particular user purpose. These attributes 114 are generally defined by the access/change log policy software 116 to identify files (or other objects) to be logged as well as attributes to be logged.

Figure 2:
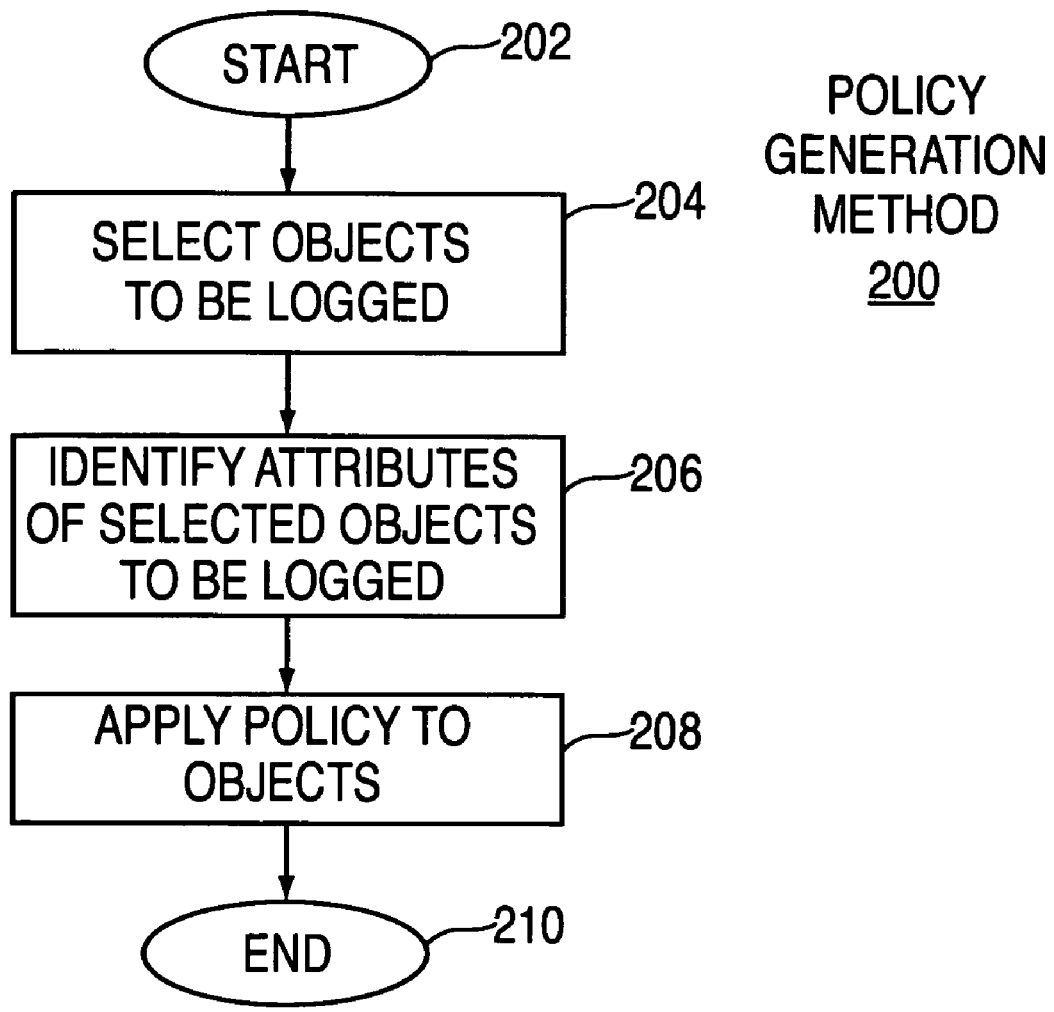
FIG. 2 depicts a flow diagram of a policy generation method for a policy-based access/change log.

FIG. 2 depicts a flow diagram of a method 200 representing one embodiment of a access/change log policy generation technique. The method 200 begins step 202 and proceeds to step 204 where objects are selected for logging. Objects may be selected by group, e.g., selected by directory, or individually. The specific objects to be logged may also be defined using an exclusionary technique, where, rather than specifically selecting objects for logging, objects are selected for exclusion from logging and the non-excluded objects are, by default, selected for logging. As such, a file system does not have to log every change that occurs to every object that is accessed by the file system. Thus, in step 204, a subset of objects is selected for logging or not excluded from logging.

At step 206, the user identifies attributes of the objects to be logged. A user may desire to track every write operation that occurs to a particular file along with the identity of a person that is performing the write operation. This sort of information would be identified as an attribute that is to be logged. Those attributes are logged within the access/change log file 112 as attributes 114. Other examples of attributes that can be tracked include hotspots within a file to identify locations (offsets) within the file where read and write operations are occurring on a regular basis. Further examples of attributes that may be selectively logged include, but are not limited to, offsets in the file where the file was modified and the size of the modification, changes in allocation/reallocation policies, the occurrence of setting file reservations, opens/closes/accesses of a file, offset/length of read accesses, file input/output statistics that may include number/volume of reads/writes and the time taken for those reads/writes, and the like. Additional information that may be selectively contained in an access/change log includes, but is not limited to, user name/identifier, group name/identifier, application name/identifier, computer identity information, file access time, file modification time, file creation time, file allocation/reallocation/reservation policies, file name/path/inode number, size of the file, number of links to a file, access control lists, filed named data streams and the like.

Once the objects to be logged are identified and the attributes to be logged for those selected files are identified, a policy is generated at step 208 and applied to the objects. This policy may be in the form of a policy file that is accessed when objects are modified or the object may have a field attached that is used to define the logging policy for the object. The attributes that are associated with the objects are used to define the logging of the changes and modifications to those objects.

The method 200 may establish the logging policy within a logging policy file. Such a file is consulted when an object is changed to determine whether the change is to be logged as well as identify attribute(s) of the change that are to be logged. Alternatively, the logging policy parameters (i.e., whether changes to a specific object are to be logged and which attributes are logged) may be included in the object's metadata, in the object itself, or other object related information. The policy generation method 200 ends at step 210.

Figure 3:
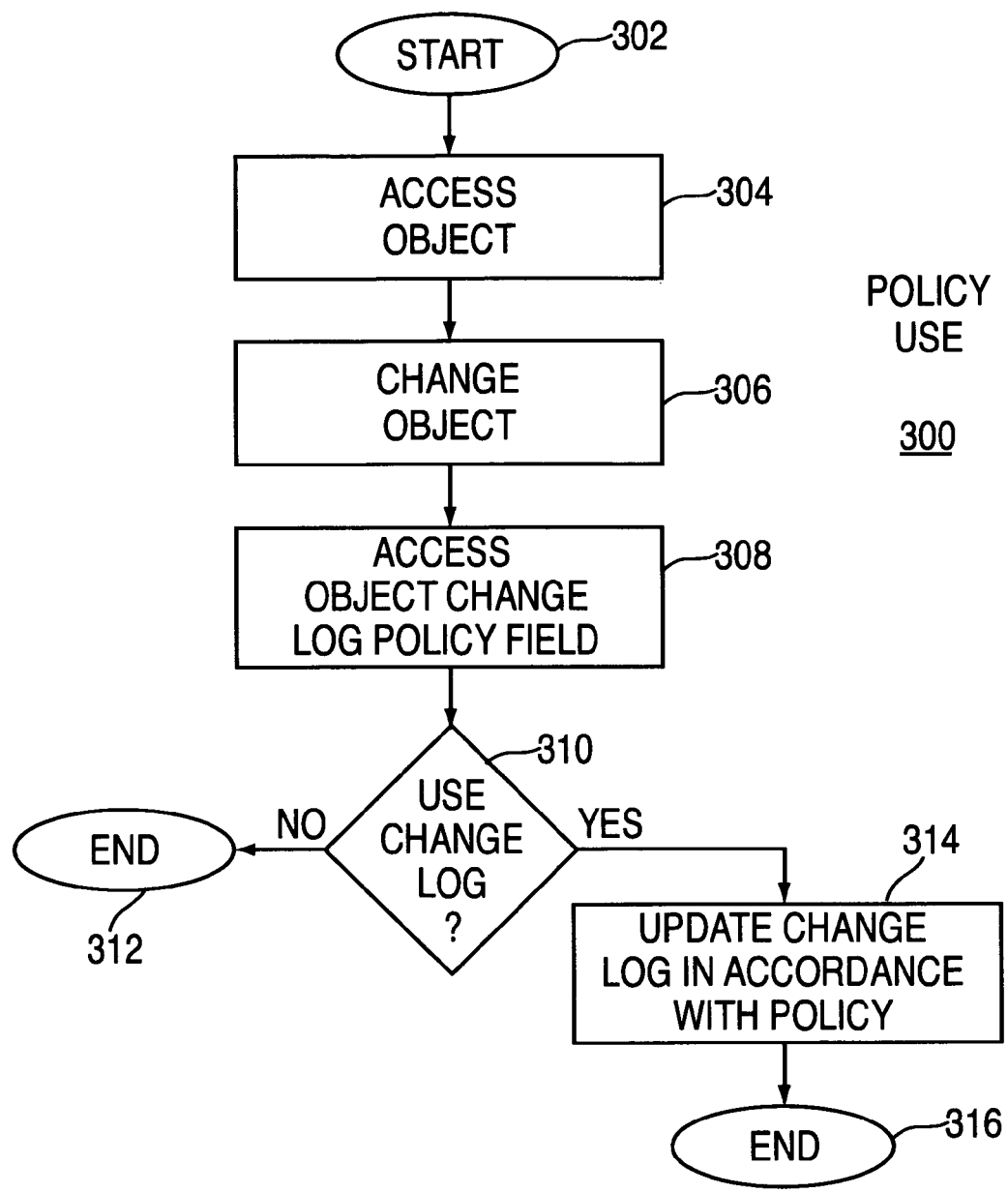
FIG. 3 depicts a flow diagram of a method of using a policy-based access/change log in accordance with the present invention.

FIG. 3 depicts a flow diagram of a method 300 of using a policy-based access/change log in accordance with one embodiment of the invention. The method 300 begins at step 302 and proceeds to step 304, where an object is accessed by the file system. At step 306, the object is changed. In many file systems, the accessing and changing of the object would occur in one step but, for clarity, two steps are shown in the method 300.

At the time that an object is changed, at step 308, the file system accesses the object access/change log policy field to identify the policy that should be used for logging changes to that particular object. This policy field, as discussed above, may be contained within the object itself, within the object's metadata, or in a separate file that identifies the policy for that particular object. At step 310, the method 300 queries whether the change that has occurred at step 306 is to be logged. The policy defines whether this object is to have an update entered into the access/change log and what that update should be if one is to be entered. If the change is not to be logged, the method 300 proceeds to step 312 and ends. If the query at step 310 is answered affirmatively, the method 300 proceeds to step 315, where an update is entered into the access/change log in accordance with the policy. Generally, an attribute of the object is logged in accordance with the policy. At step 316 the process ends.

Using the foregoing policy-based logging technique, a access/change log can be created for tracking specific object attributes that serve a specific purpose for a user or administrator. For example, a access/change log could be created using a policy of logging a user name, file access time, and file name, such that statistics can be accumulated regarding user access to particular files or, if file offset is logged, to particular locations in files. In this manner, any file attribute or combination of attributes can be used to define a logging policy.

While the foregoing is directed to embodiments of the present invention, other and further embodiments of the invention may be devised without departing from the basic scope thereof, and the scope thereof is determined by the claims that follow

The invention claimed is:

1. A method for creating a logging policy for an access/change log, comprising:
   selecting at least one object of a file system executing on a computer system to be logged;
   identifying at least one attribute of the selected at least one object to be logged; and
   generating a logging policy based upon the selected at least one object and the at least one attribute wherein the at least one attribute comprises at least one of user name/identifier, group name/identifier, application name/identifier, computer identity information, file access time, file modification time, file creation time, file allocation/reallocation/reservation policies, file name/path/inode number, size of the file, number of links to a file, offset/length of access/modification, access control lists, filed named data streams.

2. The method of claim 1 further comprising:
   associating the logging policy with the at least one object.

3. The method of claim 2 further comprising storing the logging policy in a file.

4. The method of claim 2 further comprising storing the logging policy in metadata related to the at least one object.

5. The method of claim 1 further comprising:
   detecting at least one of a change or access associated with the at least one object;
   accessing the logging policy; and
   updating a access/change log in accordance with the logging policy.

6. The method of claim 1 wherein the selected at least one object forms a subset of less than all objects that are available for logging.

7. A method of using a policy-based access/change log comprising;
   detecting at least one of a change or access associated with at least one object of a file system executing on a computer system;
   accessing a logging policy associated with the at least one object; and
   updating a access/change log in accordance with the logging policy, wherein the logging policy was generated based upon at least one attribute of the at least one object wherein the at least one attribute comprises at least one of user name/identifier, group name/identifier, application name/identifier, computer identity information, file access time, file modification time, file creation time, file allocation/reallocation/reservation policies, file name/path/inode number, size of the file, number of links to a file, offset/length of access/modification, access control lists, filed named data streams.

8. The method of claim 7 wherein the updating step further comprises:
   logging at least one attribute of the at least one object in accordance with the logging policy.

9. A computer readable medium comprising software that, when executed by a processor within a computer system, causes the computer system to perform a method for creating a logging policy for an access/change log, comprising:
   selecting at least one object of a file system executing on a computer system to be logged;
   identifying at least one attribute of the selected at least one object to be logged; and
   generating a logging policy based upon the selected at least one object and the at least one attribute wherein the at least one attribute comprises at least one of user name/identifier, group name/identifier, application name/identifier, computer identity information, file access time, file modification time, file creation time, file allocation/reallocation/reservation policies, file name/path/inode number, size of the file, number of links to a file, offset/length of access/modification, access control lists, filed named data streams.

10. The method of claim 9 further comprising:
    associating the logging policy with the at least one object.

11. The method of claim 10 further comprising storing the logging policy in a file.

12. The method of claim 10 further comprising storing the logging policy in metadata related to the at least one object.

13. The method of claim 9 further comprising:
    detecting at least one of a change or access associated with the at least one object;
    accessing the logging policy; and
    updating a access/change log in accordance with the logging policy.

14. A computer readable medium comprising software that, when executed by a processor within a computer system, causes the computer system to perform a method of using a policy-based access/change log comprising;
    detecting at least one of a change or access associated with at least one object of a file system executing on a computer system;
    accessing a logging policy associated with the at least one object; and
    updating a access/change log in accordance with the logging policy, wherein the logging policy was generated based upon at least one attribute of the at least one object wherein the at least one attribute comprises at least one of user name/identifier, group name/identifier, application name/identifier, computer identity information, file access time, file modification time, file creation time, file allocation/reallocation/reservation policies, file name/path/inode number, size of the file, number of links to a file, offset/length of access/modification, access control lists, filed named data streams.

15. The method of claim 14 wherein the updating step further comprises:
    logging at least one attribute of the at least one object in accordance with the logging policy.

* * * * *